United States Patent
Velusamy et al.

(10) Patent No.: US 9,749,827 B2
(45) Date of Patent: Aug. 29, 2017

(54) E-911 INFORMATION AUTO-POPULATION FOR WI-FI CALLING

(71) Applicant: T-Mobile USA, Inc., Bellevue, WA (US)

(72) Inventors: Senthil Kumar Mulluppadi Velusamy, Bellevue, WA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 506 days.

(21) Appl. No.: 13/827,446

(22) Filed: Mar. 14, 2013

(65) Prior Publication Data

US 2013/0244609 A1 Sep. 19, 2013

Related U.S. Application Data (60) Provisional application No. 61/612,150, filed on Mar. 16, 2012.

(51) Int. Cl.
| | |
|---|---|
| *H04M 11/04* | (2006.01) |
| *H04W 4/22* | (2009.01) |
| *H04W 16/00* | (2009.01) |
| *H04W 4/12* | (2009.01) |

(52) U.S. Cl.
CPC ............... *H04W 4/22* (2013.01); *H04W 4/12* (2013.01); *H04W 16/00* (2013.01)

(58) Field of Classification Search
CPC ....... H04W 4/22; H04W 76/007; H04W 4/02; H04W 4/025

USPC ......... 455/414.1, 404.2, 404.1, 456.1, 456.2, 455/456.6; 370/352; 379/45
See application file for complete search history.

(56) References Cited

U.S. PATENT DOCUMENTS

| | | | |
|---|---|---|---|
| 2006/0072547 A1 | 4/2006 | Florkey et al. | |
| 2007/0216535 A1* | 9/2007 | Carrino ............... | G06F 17/3087 340/573.1 |
| 2008/0200143 A1* | 8/2008 | Qiu et al. ................... | 455/404.2 |
| 2008/0304630 A1 | 12/2008 | Nguyen et al. | |
| 2009/0003312 A1* | 1/2009 | Velazquez ............ | H04M 3/5116 370/352 |
| 2009/0177730 A1 | 7/2009 | Annamalai et al. | |
| 2009/0201916 A1* | 8/2009 | Caron et al. .................. | 370/352 |
| 2009/0215427 A1* | 8/2009 | Hawkins .................... | 455/404.2 |
| 2009/0219921 A1 | 9/2009 | Beinroth et al. | |
| 2009/0252067 A1 | 10/2009 | McGary | |
| 2010/0003946 A1* | 1/2010 | Ray ........................ | G10L 13/043 455/404.1 |
| 2010/0190468 A1* | 7/2010 | Scott .................... | H04M 1/2745 455/404.2 |

(Continued)

OTHER PUBLICATIONS

PCT Search Report and Written Opinion mailed Jun. 28, 2013 for PCT application No. PCT/US13/32160, 10 pages.

*Primary Examiner* — Jean Gelin
(74) *Attorney, Agent, or Firm* — Lee & Hayes, PLLC (57) ABSTRACT

Techniques for auto-populating emergency geo-location address information are described. Instances of geo-location address information may be acquired from a variety of different sources. The instances of geo-location address information may be prioritized based at least in part on each one's respective source. A candidate geo-location address may be determined and may be used to auto-populate emergency address information.

19 Claims, 8 Drawing Sheets

(56) References Cited

U.S. PATENT DOCUMENTS

| | | | |
|---|---|---|---|
| 2010/0233991 A1* | 9/2010 | Crawford | H04L 45/00 455/404.1 |
| 2011/0112858 A1* | 5/2011 | Neal | G06F 19/327 705/2 |
| 2011/0263219 A1* | 10/2011 | Hasenfang et al. | 455/404.2 |
| 2013/0143516 A1* | 6/2013 | Winterbottom | H04W 4/22 455/404.2 |
| 2014/0143004 A1* | 5/2014 | Abhyanker | G06Q 10/087 705/7.19 |
| 2014/0143061 A1* | 5/2014 | Abhyanker | G06Q 50/01 705/14.58 |
| 2014/0222577 A1* | 8/2014 | Abhyanker | H04W 4/22 705/14.58 |

\* cited by examiner

E-911 INFORMATION AUTO-POPULATION FOR WI-FI CALLING

CROSS-REFERENCE TO RELATED APPLICATIONS

This Application claims benefit, under 35 U.S.C. §119(e), of U.S. Provisional Patent Application No. 61/612,150, filed Mar. 16, 2012, which is incorporated herein, by reference, in its entirety.

BACKGROUND

Mobile telecommunications devices, such as smart-phones and laptops, commonly have the ability to participate in a cellular telecommunications network typified by high-power/long distance communications networks over licensed spectrum, and alternatively over low-power/short distance communications networks, over unlicensed spectrum, such as a wireless point-to-point communications network. A typical example is a smart-phone that has a data connection over a 3G or 4G cellular plan, but at the same time may participate on a wireless point-to-point communications network (e.g., a Wireless Fidelity (Wi-Fi) (IEEE 802.11) network and/or a Bluetooth (IEEE 802) network).

A choice between a cellular telecommunications and wireless point-to-point communications network provides a mobile telecommunications device with a corresponding choice for voice communications. For example, a smart-phone may use voice communications over a cellular network or alternatively over a Wi-Fi network via Voice over Internet Protocol ("VoIP"). This is sometimes called Wi-Fi calling ("WFC").

A user may desire to utilize a wireless point-to-point communications network for conducting voice communications for a number of reasons. For example, the user may be at a location where quality of service over a cellular telecommunications network is not as good or reliable as service over a wireless point-to-point communications network. As another example, the user may determine that conducting voice communications over a wireless point-to-point communications network may cost less that conducting the same voice communications over a cellular telecommunications network, e.g., long distance calling charges may be cheaper via WFC than over a cellular telecommunications network.

However, the ability to access emergency services by dialing 911 is a vital component of public safety and emergency preparedness. The Federal Communications Commission (FCC) has established a set of rules and regulations that require interconnected VoIP service providers to deliver enhanced emergency (E911) services to their subscribers. Interconnected VoIP service providers connect the IP realm and the Public Switched Telephone Network (PSTN), allowing subscribers to benefit from increased efficiency by routing calls over the internet.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In many VoIP applications, users need to manually enter emergency 911 ("E-911") geo-location address information. Among other things, E-911 information includes the physical geo-location address of the user, to provide first responders, such as policemen and firemen, with a location to go to, in the event the user initiates an E-911 call. The geo-location address information should be accurate enough that the first responders need not search for the location of the emergency.

However, for a mobile telecommunications device such as a smart phone, there is no fixed physical geo-location address of the mobile telecommunications device.

This disclosure is directed to auto-populating E-911 address information.

Example Network Architecture

Figure 1:
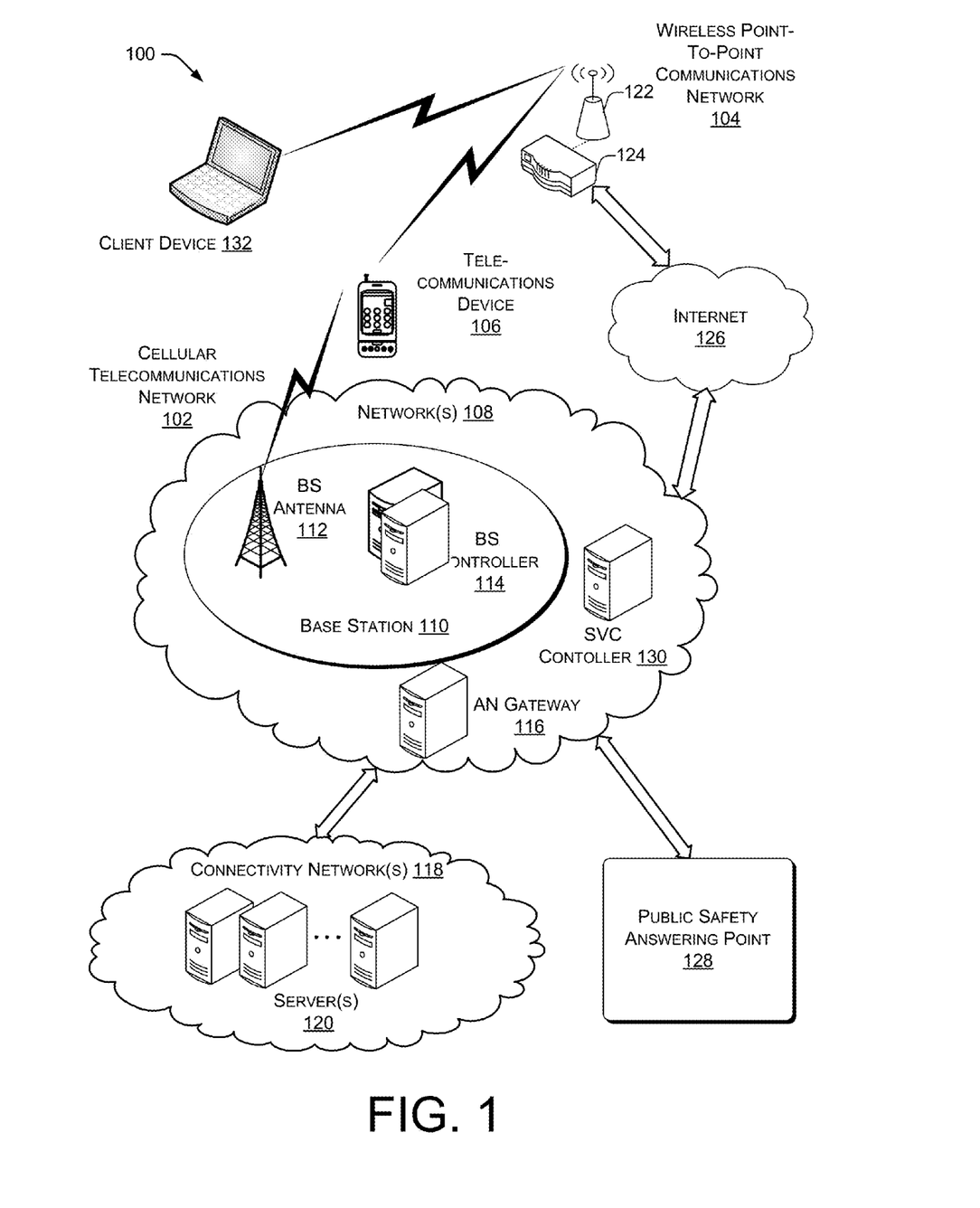
FIG. 1 illustrates an example network architecture that includes a telecommunications device configured to provide voice communications over a cellular telecommunications network and over a wireless point-to-point communications network.

FIG. 1 illustrates an exemplary architecture 100 for implementing primary voice communications over a cellular telecommunications network 102 and secondary voice communications over a wireless point-to-point communications network 104 with a telecommunications device 106.

The cellular telecommunications network 102 may include an access network 108, which is representative of any one or combination of multiple different types of networks, interconnected with each other and functioning as a single large network (e.g., circuit-switched telephone networks or IP-based packet-switch networks). The access network 108 may also include wire-based networks (e.g., PSTN, IP-based, etc.) and wireless networks (e.g., cellular, satellite, IP-based, etc.).

The access network 108 may use any number of protocols and configurations to enable the telecommunications device 106 to access other devices and resources. The access network 108 may include several types of circuit-switched telephone networks, such as Public Switched Telephone Network (PSTN) and packet-switched networks, such as the Internet. For example, the network 106 may include a Global System for Mobile Communication (GSM) network, a Code Division Multiple Access (CDMA) network, an Enhanced Data Rates for GSM Evolution (EDGE) network, a Universal Telecommunications System (UMTS) network and/or other types of circuit-switched networks, a Long Term Evolution (LTE) network, a Worldwide Interoperability for Microwave Access (WiMAX) network, the Internet, and/or other packet-switched networks. The access network 108 may also include private networks such as a mobile telephone operator's networks which may use proprietary systems or protocols that are different from the systems or protocols implemented on public networks.

In the case of wireless networks, the access network 108 may include one or more base stations, NodeBs, and eNodeBs 110 (referred to herein as "base stations 110"). Each base station 110 may include a base station antenna 112 and a base station controller or radio network controller 114 (referred to herein as "base station controller 114"). In networks 106 offering LTE connections, the base station controller 114 functionality may be distributed between an eNodeB 108 and a mobility management entity or serving gateway of a core network. Thus, while the base station controller 114 is discussed throughout as being part of a base station 110, it is to be understood that part of the base station controller 114 may be distributed between a base station 110 of an access network 108 and a core network connected to the access network 108. The base station controller 114 may, among other things, schedule network resource allocations. The base station antenna 112 may transmit/receive wireless signals to/from the telecommunications device 106. The access network 108 may provide, among other things, wireless connectivity with the telecommunications device 106.

The access network 108 may also include one or more access network gateways (AN-Gateways) 114. The AN-Gateway 116 may, among other things, provide and establish connectivity with a connectivity network 118 (also referred to as a "core network"). The connectivity network 118 may be responsible for establishing connectivity with an IP backbone and may include one or more severs 120. Severs 120 may include Dynamic Host Configuration Protocol (DHCP) servers, Domain Name System (DNS) servers, and Authentication, Authorization, and Accounting (AAA) servers.

The wireless point-to-point communications network 104 may include a transceiver 122 such as, but not limited to, a Wi-Fi or Bluetooth transceiver. The transceiver 122 may be connected to a relay router 124. The relay router 124 may be responsible for routing the Ethernet data traffic through the Internet 126 to the networks 108.

The environment 100 may also include a public safety answering point (PSAP) 128, which may receive emergency telephone calls such as "911" telephone calls. When the PSAP 128 receives a 911 telephone call from the telecommunications device 106 (or from a traditional telephone such as a landline telephone), via the cellular telecommunications network 102, the PSAP 128 may automatically identify a location of the telecommunications device 106 and direct the closest emergency personnel to that location. The PSAP 128 may also automatically identify the telephone number of the telecommunications device 106 for, among other things, call-back purposes.

The telecommunications device 106 may be configured to provide primary voice communications over the cellular telecommunications network 102 and to provide secondary voice communications (e.g., VoIP communications) over the wireless point-to-point communications network 104. The telecommunications device 106 may be configured to auto-populate E-911 address information.

The environment 100 may also include a secondary voice communication (SVC) controller 130, which may, among other things, register the telecommunications device 106 and may auto-populate E-911 address information. In some embodiments, the telecommunications device 106 may be configured to be unable to provide secondary voice communications over the wireless point-to-point communications network 104 until the telecommunications device 106 is registered. In other embodiments, the secondary voice communication controller 130 may prevent the telecommunications device 106 from conducting secondary communicate secondary voice communications over the wireless point-to-point communications network 104 until the telecommunications device 106 is registered.

The environment 100 may also include a computing device 132, which may communicate with the SVC controller 130 via the wireless point-to-point communications network 104. A user of the computing device 132 may log into the SVC controller 130 and enter user profile information. The user's profile information may include one or more geo-location addresses such as a primary residence geo-location address, a secondary residence geo-location address, work geo-location address, geo-location addresses of friends and/or relatives, geo-location addresses of locations frequented (e.g., a favorite coffee shop, etc.). The geo-location addresses in the user's profile may be prioritized. In some instances, the geo-location addresses may be dynamically prioritized. For example, the work geo-location address may have the highest priority during times when the user is at the work geo-location address (or when the user is assumed to be at the work geo-location address such as during the user's normal working times) and the primary residence geo-location address may have the highest priority during times when the user is at the primary residence geo-location address (or when the is assumed to be at the primary residence geo-location address based on the user's history). The user may register the telecommunications device 106 with the SVC controller 130 via the computing device 132. During registration, the user may verify at least one geo-location address as an emergency services address—the PSAP 128 may send emergency services to the verified emergency services address.

In some embodiments, the telecommunications device 106 may be configured to communicate with the SVC controller 130, and the user may utilize the telecommunications device 106 to log into the SVC controller 130 and enter user profile information.

In some embodiments, the computing device 132 may be located at a point-of-sale of a merchant. The merchant may be affiliated with a cellular service provider that provides cellular telecommunications services to the telecommunications device 106. Personnel of the merchant may utilize the computing device 132 to log into the SVC controller 130 and enter user profile information. For example, a user may come to the merchant and purchase the telecommunications device 106. The merchant may, if necessary, create an account for the user and a user profile. However, if the user already has an account, the merchant may update account and user profile information. In some instances, the merchant may load a user profile into the telecommunications device 106.

Example Secondary Voice Communication Controller

Figure 2:
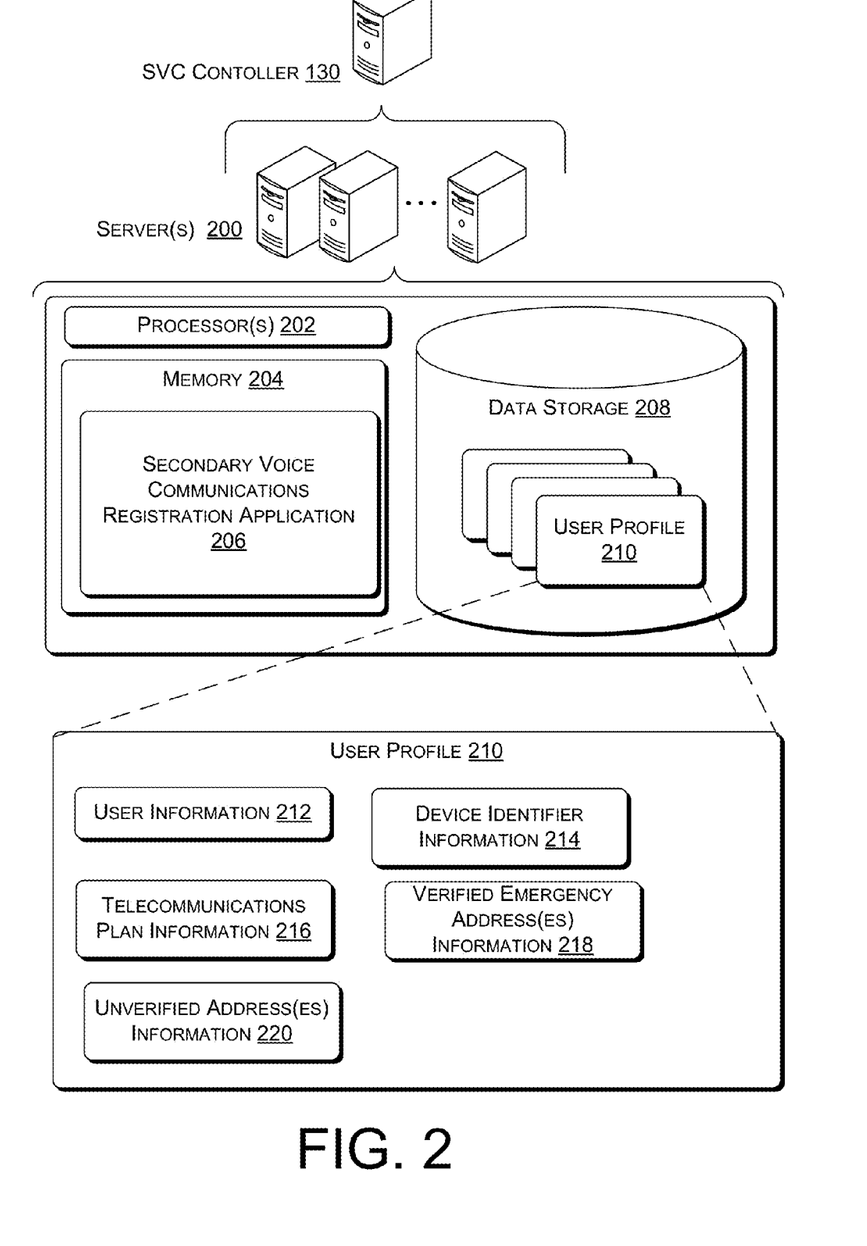
FIG. 2 is a block diagram showing various components of an illustrative secondary voice communication (SVC) controller shown in FIG. 1.

FIG. 2 shows the secondary voice communication (SVC) controller 130 such as might be used in conjunction with the techniques described here.

The secondary voice communication controller 130 may include one or more server(s) 200 that include processors(s) 202 and memory 204. The memory 204 may include volatile memory (such as RAM), nonvolatile memory, removable memory, and/or non-removable memory, implemented in any method or technology for storage of information. Also, a processor may include onboard memory in addition to or instead of the memory 206. Some examples of computer-readable storage media which may be included in the memory, and/or processor include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information.

The memory 204 may store various modules, applications, programs, or other data. The memory 204 may include instructions that, when executed by the processor(s) 202, cause the processors to perform the operations described herein. In some embodiments, the memory 204 may store a secondary voice communications registration application 206. The secondary voice communications registration application 206 may include a number of modules that perform some or all of the various operations described herein.

In addition, the server(s) 200 may include data storage 208 for storing, among other things, user profiles 210. A user profile 210 may include user information 214 such as a user's name and geo-location address. In some instance, the geo-location address may be a billing geo-location address associated with a service account for the telecommunications device 106 or a residence of the user of the telecommunications device 106 or a business geo-location address.

The device profile data 210 may also include device identifier information 214 such as, but not limited to, a telephone number for the telecommunications device 106 and may further telecommunications plan information 216. The telecommunications plan information 216 may include one or more device identifiers for other telecommunications devices that are in the same service plan.

The device profile data 210 may also include verified emergency address(es) information 218. The verified emergency address(es) information 218 may include at least one geo-location address, verified by the user, at which emergency services may be sent to by the PSAP 128. In some instances, the verified emergency address(es) information 218 may include a primary geo-location address such as a residence, a secondary geo-location address such as a place of employment, and a tertiary geo-location address, which may correspond to a geo-location address of a location that user visits on a recurring basis (e.g., a favorite coffee shop, a relative's residence, a friend's residence, a second residence, etc.). In some instances, the verified emergency address(es) information 218 may include multiple verified geo-location addresses, which may be selectable in a pre-determined order.

The device profile data 210 may also include unverified address(es) information 220. The unverified address(es) information 220 may include geo-location addresses for locations that telecommunications device 106 has visited. In some embodiments, the secondary voice communications registration application 206 may monitor the telecommunications device 106 and gather location information for the telecommunications device 106, and in other embodiments, the telecommunications device 106 may provide, some or all, of the location information to the secondary voice communications registration application 206. The location information may include GPS data and/or network information. Network information may include IP addresses for access points to the wireless point-to-point communications network 104. The secondary voice communications registration application 206 may associate the network information with corresponding geo-location addresses. For example, telecommunications device 106 may access the wireless point-to-point communications network 104, via the transceiver 122, at a public "hot spot" such as a coffee shop. The secondary voice communications registration application 206 may maintain a database of "hot spots" and corresponding geo-location addresses and determine the geo-location address for the coffee shop "hot spot" utilizing the database.

The unverified address information 218 may include geo-location addresses obtained from other user profiles. For example, the telecommunications device 106 may be in a plan along with at least one other telecommunications device, for which there is a corresponding user profile. The secondary voice communications registration application 206 may copy geo-location address(es) from the user profiles of other telecommunications devices in the same plan.

The unverified address information 218 may be used to auto-populate a registration/verification form with the geo-location addresses. Geo-location addresses that are verified may then be moved to the verified emergency address(es) information 218.

In some embodiments, a user profile 210 may be configurable by the user/person associated with the user profile. For example, a user might associate a geo-location address of their residence with a network (e.g., a personal Wi-Fi network) at the residence, their work-place network with their place of employment, and various public hotspots with corresponding locations. A user may also associate an alias with the location indicia and physical geo-location address. In this way, the mobile device might display a list of aliases corresponding to physical locations, for the user to choose, thereby simplifying entry of E-911 information.

In some embodiments, the first time a user attempts to conduct secondary communicate secondary voice communications, over the wireless point-to-point communications network 104 with the telecommunications device 106, the secondary voice communications registration application 206 may check to see whether the telecommunications device 106 is registered. Registration of the telecommunications device 106 may include the user verifying a geo-location address at which emergency services may be sent to by the PSAP 128. The secondary voice communications registration application 206 may determine that the telecommunications device 106 is not registered based at least in part on the verified emergency address(es) information 218 having no geo-location addresses. The secondary voice communications registration application 206 may deny requests for the telecommunications device 106 conduct secondary communicate secondary voice communications, over the wireless point-to-point communications network 104 until the telecommunications device 106 is registered.

In some embodiments, the secondary voice communication controller 130 may provide the telecommunications device 106 with one or more geo-location addresses the first time a user attempts to conduct secondary communicate secondary voice communications, over the wireless point-to-point communications network 104 with the telecommunications device 106 and/or when the user attempts to register the telecommunications device 106. As discussed below, the telecommunications device 106 may auto-populate a registration/verification form with the geo-location addresses. The secondary voice communication controller 130 may receive the registration/verification form from the telecommunications device 106 and update the device profile 210 accordingly.

In some embodiments, the secondary voice communication controller 130 may provide the telecommunications device 106 with one or more geo-location addresses from time-to-time. For example, the secondary voice communication controller 130 may determine not to provide one or more geo-location addresses when the telecommunications device 106 is currently at a verified emergency services address. However, when the telecommunications device 106 is located at a site for which there is no verified emergency services address, the secondary voice communication controller 130 may provide the telecommunications device 106 with one or more geo-location addresses when the user attempts to conduct secondary voice communications over the wireless point-to-point communications network 104.

Telecommunications Device

Figure 3:
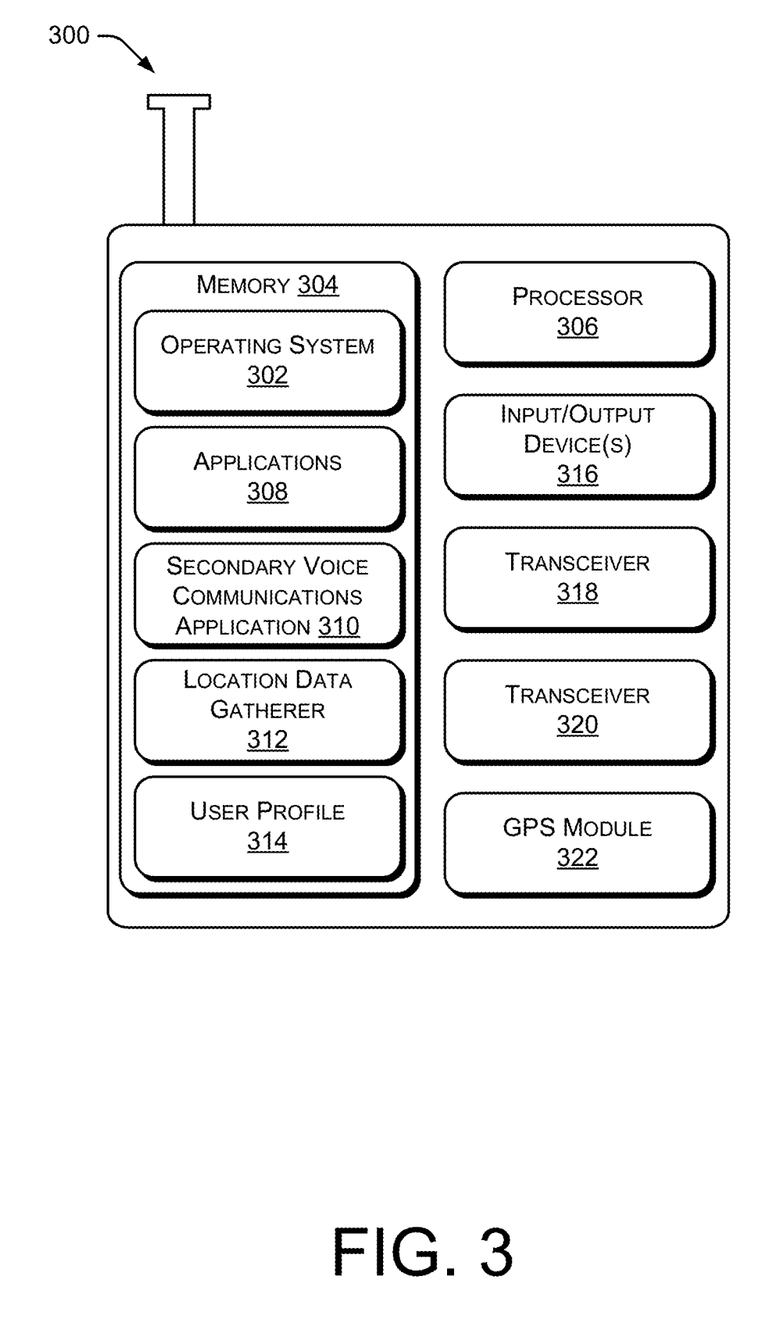
FIG. 3 is a block diagram showing various components of an illustrative telecommunications device.

FIG. 3 shows a telecommunications device 300 such as might be used in conjunction with the techniques described here. In many cases, telecommunications device 300 will be what is commonly referred to as a "cell phone," although the described techniques can be used in conjunction with any telecommunications device.

The telecommunications device 300 typically has an operating system 302 executed from some form of solid-state memory 304 by one or more processors 306.

Applications 308, secondary voice communications application 310, location data gatherer 312, and user profile 314 may also be stored in memory 304. Applications 308 may include custom software, which may be preloaded onto the device to perform various functions and to support the different communication modes described above, and third-party software. Non-limiting examples of applications 312 include e-mail, instant messaging, address book, day organizer, etc.

The secondary voice communications application 310 may perform various functions to conduct and support secondary voice communications over the point-to-point network 104 such as VoIP communications. In some embodiments, the secondary voice communications application 310 may register the telecommunications device 300 with the SVC controller 130. In some embodiments, the secondary voice communications application 310 may determine whether the telecommunications device 300 is registered with the SVC controller 130 prior to commencing a secondary voice communications session over the point-to-point network 104. The secondary voice communications application 310 may utilize the user profile 314 to determine whether the telecommunications device 300 is registered. The user profile 314 may include some or all of the information from the user profile 210. In some instances, the user profiles 210 and 314 may, from time to time, be synchronized.

The user interfaces of telecommunications devices vary widely. The user interfaces include input/output devices 316. The most basic input/output devices 316 might include a numeric telephone-type keypad, to which has been added "talk" and "end" buttons for controlling voice calls, and a basic output device consisting of a single-line display for indicating telephone numbers. Other input/output devices 316 might include touch-screen interfaces, alpha-numeric keypads, a microphone, and other forms of input devices. Input/output devices 316 may also include display screens, speakers, and other forms of output devices.

The telecommunications device 300 also includes one or more transceivers 318-320. Transceiver 318 may provide a radio interface employed by a cellular communications network for voice and data communications. Transceiver 320 may provide a wireless point-to-point communications interface such as Wireless Fidelity (Wi-Fi) (IEEE 802.11) or Bluetooth (IEEE 802). Although telecommunications device 300 is illustrated having two transceivers there may be more or fewer transceivers in alternative embodiments. For example, the telecommunications device 300 may include one or more multi-mode transceivers having the functionality of at least two of the transceivers 318-320.

The telecommunications device 300 also includes a Global Positioning System (GPS) module 322. The GPS module 322 receives signals from a GPS system, and the GPS module 322 is configured to determine a current location of the telecommunications device 300 based on the GPS signals.

The location data gather 312 may gather location information for determining a location of the telecommunications device 300. In some instances, the location data gather 312 may gather location information such as network information of the wireless point-to-point communications network 104 such as a location of the transceiver 122. The location data gather 312 may also gather location information from the GPS module 322. In some embodiments, the location data gather 312 may provide the gathered location information to the secondary voice communications application 310. In some embodiments, the location data gather 312 may provide the gathered location information to the secondary voice communications registration application 206. The gathered location information may be utilized to auto-populate registration/verification form with the geo-location addresses.

In some embodiments, the secondary voice communications application 310 may auto-populate a registration/verification form with the geo-location addresses.

Example Processes

Figure 4:
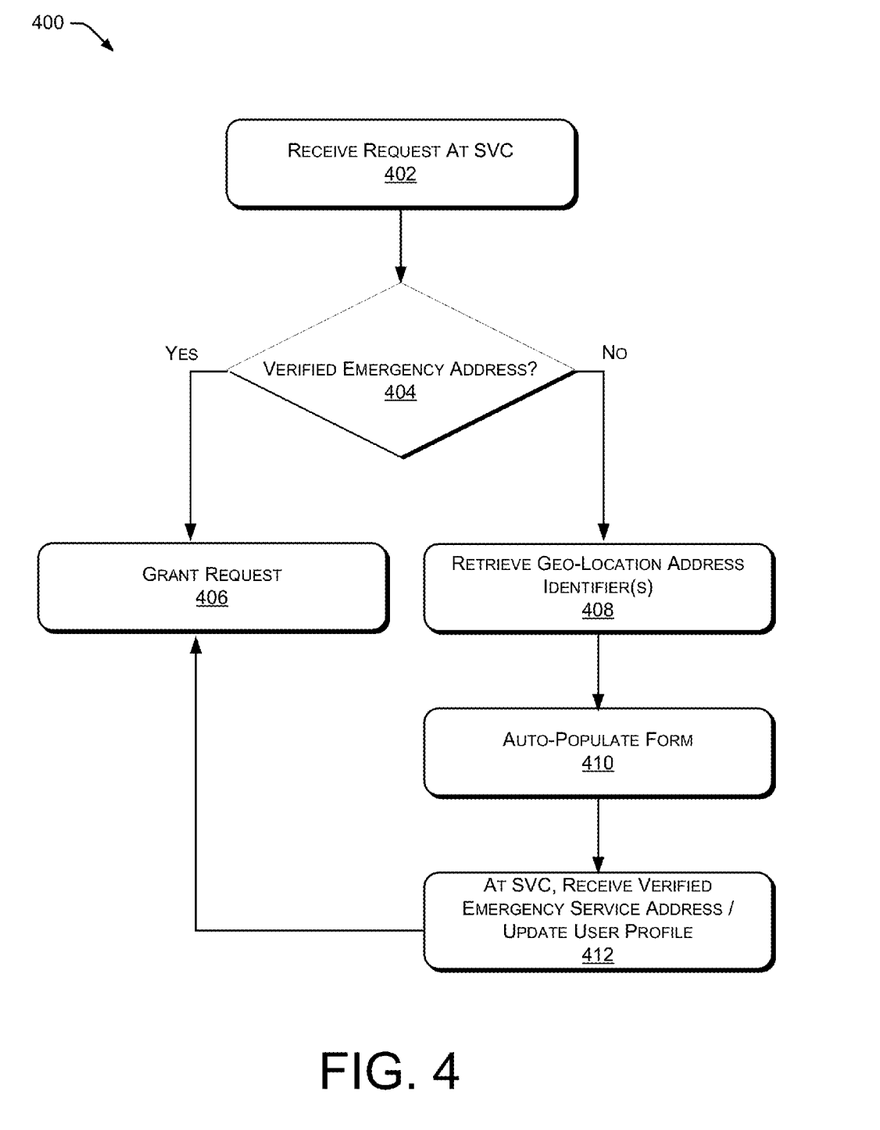
FIG. 4 is a flow diagram of a process for registering a telecommunications device.

FIG. 4 shows a process 400 for registering the telecommunications device 106 with the SVC controller 130. Process 400 and other processes discussed hereinbelow are illustrated as a collection of referenced acts arranged in a logical flow graph, which represent a sequence that can be implemented in hardware, software, or a combination thereof. In the context of software, the acts represent computer-executable instructions that, when executed by one or more processors, perform the recited operations. Generally, computer-executable instructions include routines, programs, objects, components, data structures, and the like that perform particular functions or implement particular abstract data types. The order in which the acts are described is not intended to be construed as a limitation, and any number of the described acts can be combined in any order and/or in parallel to implement the process and the other processes discussed hereinbelow.

For discussion purposes, the process 400 is described with reference to the SVC controller 130 of FIGS. 1 and 2 and the telecommunications device 106 of FIG. 1.

At 402, the SVC controller 130 receives a request for voice communications over the wireless point-to-point network. The request may be provided to the SVC controller 130 in response to the secondary voice communication application 310 being launched.

At 404, the SVC controller 130 determines whether the telecommunications device 106 has at least one verified emergency services address associated therewith. The SVC controller 130 may check the user profile 210 corresponding to the telecommunications device 106 to determine whether at least one verified emergency services address is associated with the telecommunications device.

If affirmative, the process continues at 406, and if negative, the process continues at 408.

At 406, the SVC controller 130 grants the request for voice communications over the wireless point-to-point network 104.

At 408, the SVC controller 130 retrieves one or more geo-location address identifiers from the user profile 210 for the telecommunications device 106. A geo-location address identifier may be an actual address or an alias for an actual address. For example, "HOME" may be an alias for a geo-location address of a residence.

At 410, the retrieved geo-location address identifiers may be prioritized and may be used to auto-populate a registration/verification form. In some embodiments, the SVC controller 130 may provide the telecommunications device 106 with the retrieved geo-location address identifiers, and the telecommunications device 106 may then auto-populate a registration/verification form with at least one of the geo-location address identifiers. In some embodiments, the SVC controller 130 may auto-populate a registration/verification form with at least one of the geo-location address identifiers and may provide the telecommunications device 106 with the auto-populated registration/verification form.

At 412, the SVC controller 130 receives at least one verified emergency services address from the telecommunications device 106. The SVC controller 130 may then update the user profile 210 for the telecommunications device 106.

The process then continues at 406.

Figure 5:
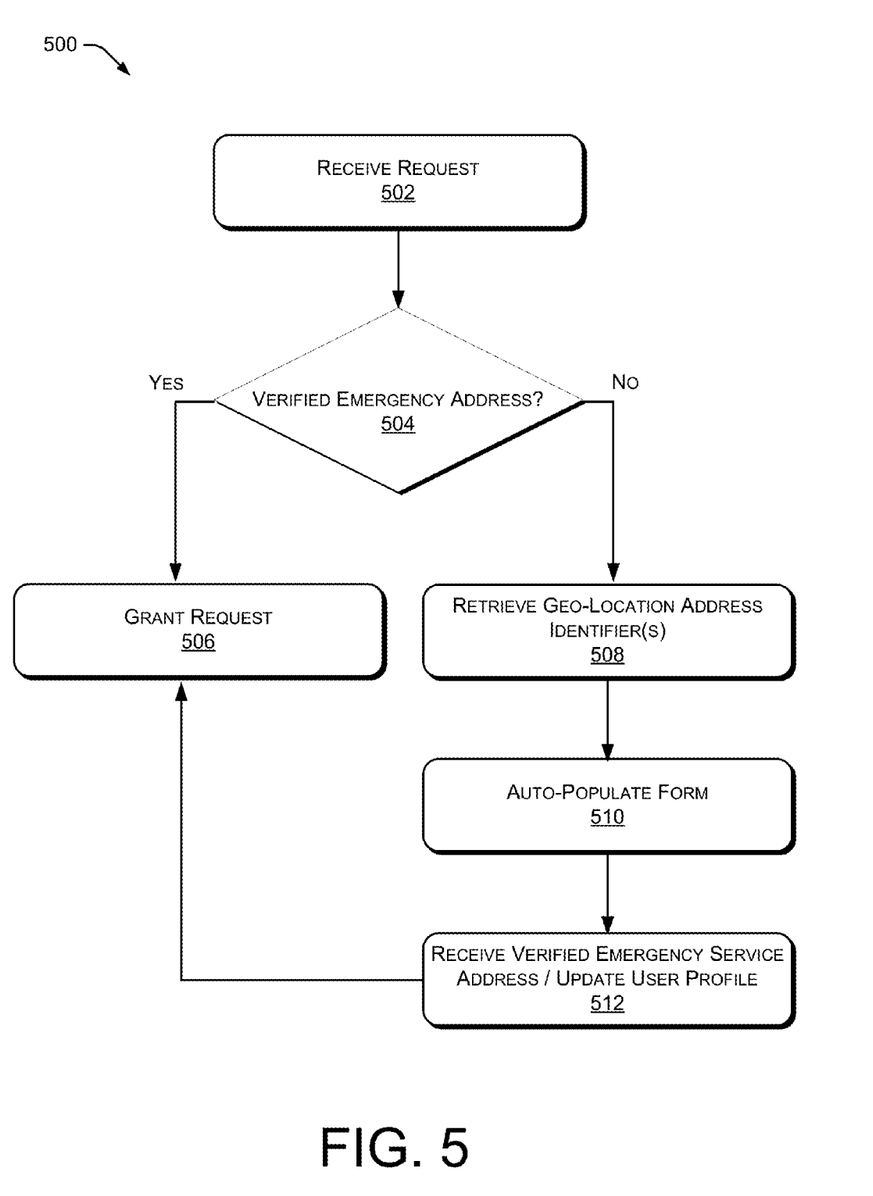
FIG. 5 is a flow diagram of a process for providing secondary voice communications over the wireless point-to-point network of FIG. 1.

FIG. 5 shows a process 500 for providing secondary voice communications over the wireless point-to-point network 104 by the telecommunications device 106. For discussion purposes, the process 500 is described with reference to the telecommunications device 300 of FIG. 3.

At 502, the secondary voice communications application 310 receives a request for voice communications over the wireless point-to-point network 104. The request may be in response to the secondary voice communication application 310 being launched.

At 504, the secondary voice communications application 310 determines whether the telecommunications device 106 has at least one verified emergency services address associated therewith. The secondary voice communications application 310 may check the user profile 314 to determine whether at least one verified emergency services address is associated with the telecommunications device 106.

If affirmative, the process continues at 506, and if negative, the process continues at 508.

At 506, the secondary voice communications application 310 grants the request for voice communications over the wireless point-to-point network 104.

At 508, the secondary voice communications application 310 retrieves one or more geo-location address identifiers from the user profile 314. A geo-location address identifier may be an actual address or an alias for an actual address. For example, "HOME" may be an alias for a geo-location address of a residence.

At 510, the retrieved geo-location address identifiers may be prioritized and may be used to auto-populate a registration/verification form. The secondary voice communications application 310 may auto-populate a registration/verification form with at least one of the geo-location address identifiers.

At 512, the secondary voice communications application 310 receives user-input for verifying at least one emergency services address. The secondary voice communications application 310 may then update the user profile 314.

The process then continues at 506.

Figure 6:
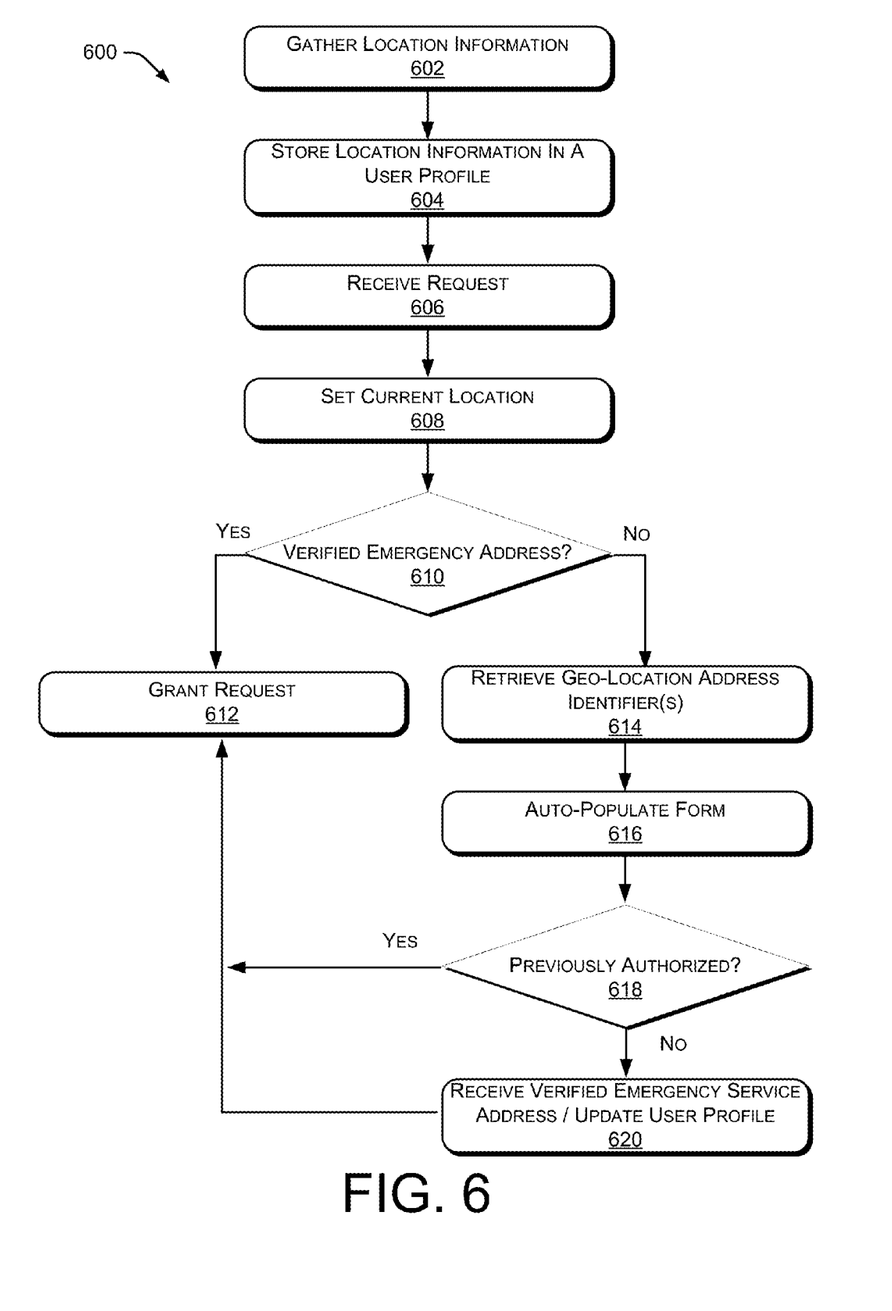
FIG. 6 is a flow diagram of another process for providing secondary voice communications over the wireless point-to-point network of FIG. 1.

FIG. 6 shows another process 600 for providing secondary voice communications over the wireless point-to-point network 104 by the telecommunications device 106.

At 602, location information is gathered. The location information may be gathered by the telecommunications device 106 and/or by the SVC controller 130. In some embodiments, the location information may be provided by a user. The user may access the SVC controller 130 and provide, among other things, geo-location addresses, aliases for geo-location addresses, network information, etc.

At 604, the location information is stored in a user profile. In some embodiments, the user profile may be stored on the telecommunications device 106. In some embodiments, the user profile may be stored remotely from the telecommunications device 106 such as at the SVC controller 130.

At 606, a request for a secondary voice communications session over the wireless point-to-point network 104 by the communications device 106 is received. In some embodiments, the request may be received by the SVC controller 130. In some embodiments, the request may be received by the secondary voice communications application 310.

At 608, a current location for the telecommunications device 106 is set. In some instances, the actual current location of the telecommunications device 106 may be undeterminable, and in those instances, the "set" current location may be a default value. In instances in which the actual current location of the telecommunications device 106 is determinable, the actual current location is determined, and the "set" current location is set to the actual current location. The actual current location may be determined by the telecommunications device 106 or by the SVC controller 130. The actual current location may be determined based at least in part on gathered location information. For example, the current location may be determined based on GPS data and/or by network information, which may include an IP address.

At 610, a determination is made as to whether the set current location matches a verified emergency address. If the determination is affirmative, the process continues at 612, where the request is granted.

If the determination is negative, the process continues at 614, where geo-location address identifiers are retrieved. The geo-location address identifiers may be retrieved from a user profile. The user profile may be stored in the telecommunications device 106 or remotely from the telecommunications device 106 such as at the SVC controller 130.

At 616, a registration/verification form may be auto-populated with one or more of the retrieved geo-location address identifiers. In some embodiments, the SVC controller 130 may provide the telecommunications device 106 with the retrieved geo-location address identifiers, and the telecommunications device 106 may then auto-populate the registration/verification form with at least one of the geo-location address identifiers. In some embodiments, the SVC controller 130 may auto-populate a registration/verification form with at least one of the geo-location address identifiers and may provide the telecommunications device 106 with the auto-populated registration/verification form. In some embodiments, the telecommunications device 106 retrieve the geo-location address identifiers and may auto-populate the registration/verification form with at least one of the geo-location address identifiers.

At 618, a determination is made as to whether the telecommunications device 106 has been previously authorized to conduct secondary voice communications over the wireless point-to-point network 104. If affirmative, the process continues at 612, where the request is granted.

If negative, the process continues at 620, where at least one verified emergency services address is received and the user profile for the telecommunications device is updated.

After 620, the process continues at 612.

Figure 7:
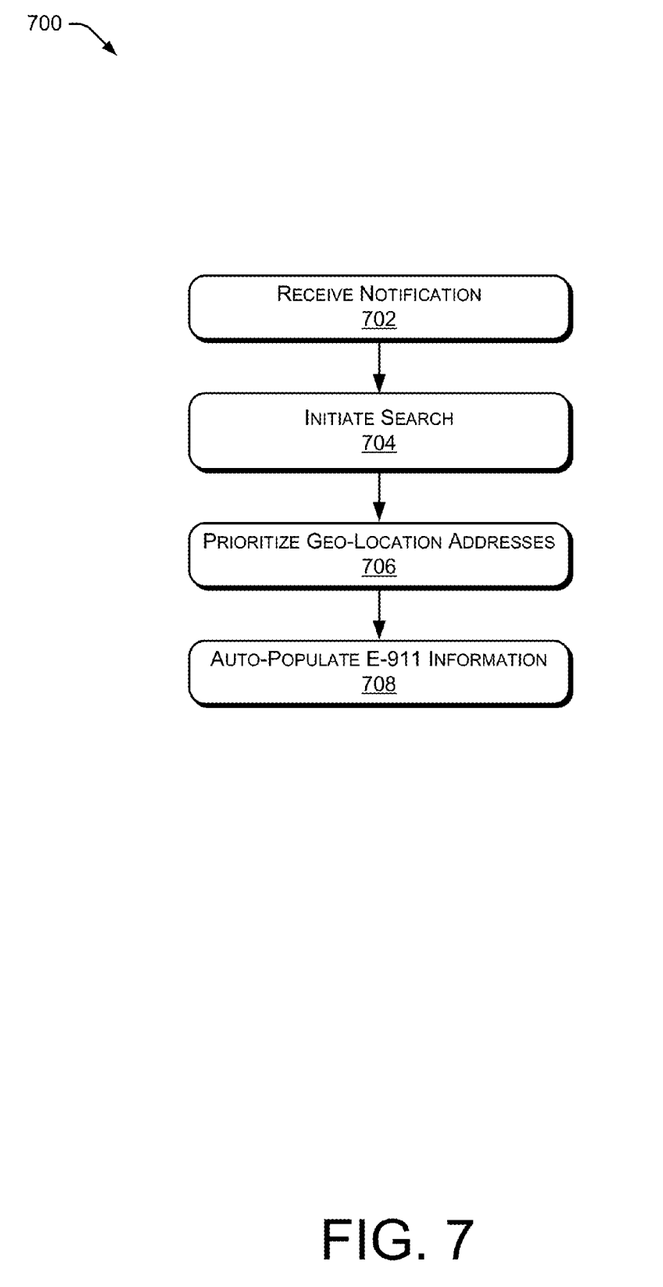
FIG. 7 is a flow diagram of another process for providing secondary voice communications over the wireless point-to-point network of FIG. 1.

FIG. 7 shows yet another process 700 for providing secondary voice communications over the wireless point-to-point network 104 by the telecommunications device 106.

At 702, the telecommunications device 106 receives a notification that a secondary voice communications application is waiting for E-911 geo-location address information.

At 704, the telecommunications device 106 initiates an E-911 geo-location address information search invoking one or more of various sources of geo-location information. This may include any one of the following user profile, vendor database, Network Identifier database, and GPS data.

User Profile:

Users can configure a profile of commonly used networks such as Wi-FI networks. For example, a user may keep a profile associating: a physical geo-location address with the user's home network; a physical geo-location address with a network at their place of employment; and physical geo-location addresses for various public hotspots. The user profile could also correlate other location indicia such as GPS coordinates and other geo-location information with a physical geo-location address. A user may also associate an alias with the location indicia and physical geo-location address. In this way, the mobile device might display a list of aliases corresponding to physical locations, for the user to choose, thereby simplifying entry of E-911 information.

Vendor Database:

Many vendors, such as coffee shops, that provide public hotspots or otherwise provide free or low cost network access. Databases of physical geo-location addresses for those hotspots may be kept and may be stored at the SVC controller 130 and/or the telecommunications device 106. Accordingly, participation in a hotspot can be resolved to a hotspot identifier, which in turn may be resolved to a physical geo-location address.

Network Identifier/WAN Internet Protocol ("IP") Address:

To participate on the wireless point-to-point network 104, the telecommunications device 106 communicates with an access point such as the transceiver 122, which has a network identifier such as an IP address. The network identifier of the transceiver 122 may be mapped to a corresponding physical geo-location address. Accordingly, the network identifier of an access point, with which the telecommunications device is communicating, may be resolved to obtain a physical geo-location address for the telecommunications device 106.

Global Positioning Satellite:

GPS coordinates/data may be correlated and resolved to a physical geo-location address.

At 706, the telecommunications device 106 correlates the various sources of geo-location information. The telecommunications device 106 may weight different sources, or make a priority or trust level of the different sources. For example, the telecommunications device 106 may consider the user profile to be fully accurate and may ignore the other sources. Alternatively, the telecommunications device 106 may make an amalgamation of a network identifier (e.g., WAN IP) resolution and a GPS resolution. The telecommunications device 106 may also provide a confidence score as part of the resolution result.

At 708, once the telecommunications device 106 determines a candidate physical geo-location address for E-911, the telecommunications device 106 may populate the E-911 information.

In some embodiments, the telecommunications device 106 may directly access a web page to register the E-911 information via a web script. In this way, the E-911 information may be automatically and transparently populated. Alternatively, the telecommunications device 106 might display a modal or non-modal dialog box allowing the user to correct or intervene. In this scenario, the telecommunications device 106 might track the user corrections, and store these corrections as part of the user profile, or other persistence, and thereby modify future auto-population of E-911 information.

Another option is to populate for various user locations to be enumerated in a modal or non-modal dialog. The enumerated user locations might be in the form of aliases that may be descriptive of the user's location. For example, aliases might be "Home", "Office", "Joe's Coffee shop", and "Public Library." In some embodiments, the user may also opt out of the E-911 auto-population feature as well.

Note that physical geo-location address information may be treated as private information. Accordingly, some embodiments may encrypt the user physical information either at time of collection or time of population.

Example User Interface

Figure 8:
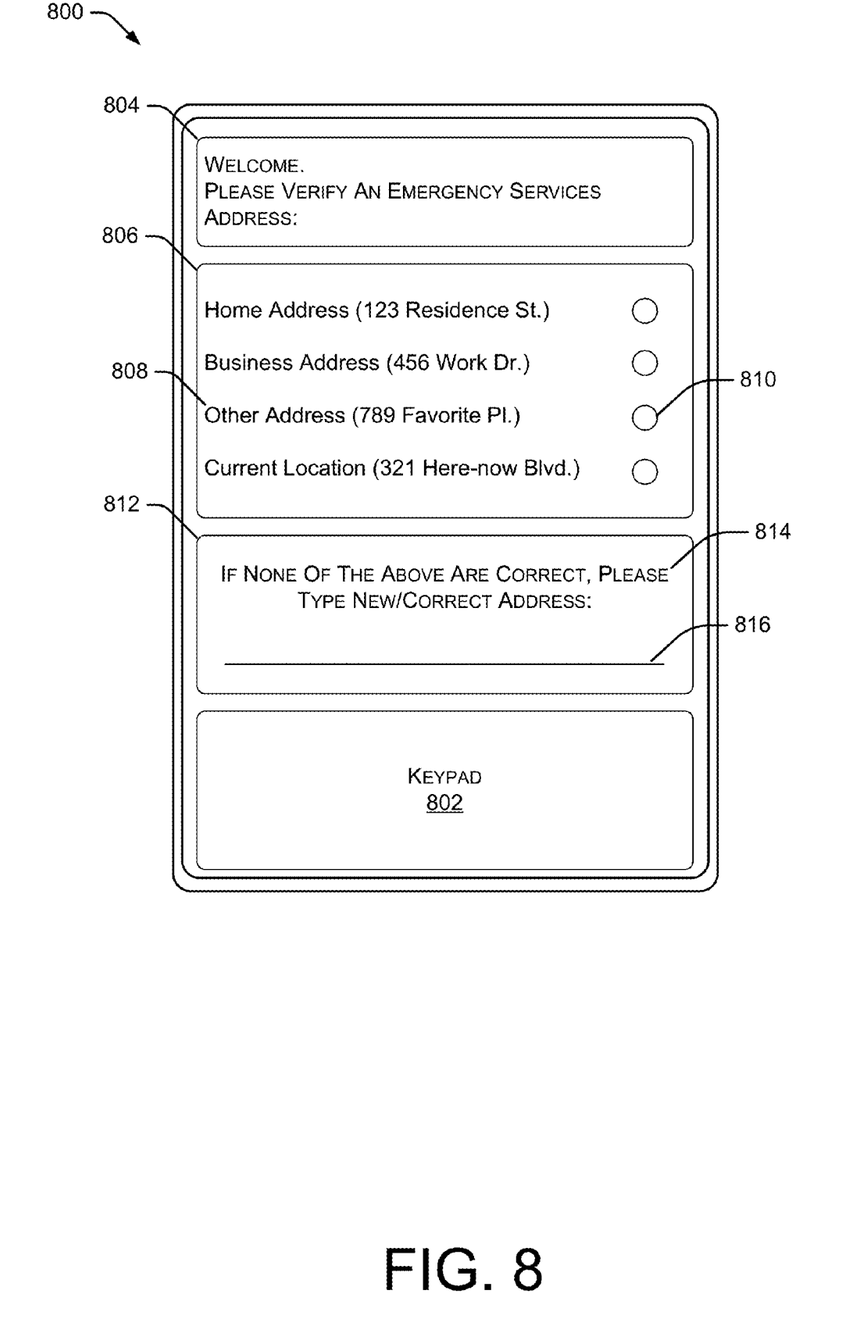
FIG. 8 is a block diagram of a user interface.

FIG. 8 shows an example user interface 800 that may be provided by the input/output devices 316 of the telecommunications device 300.

In some embodiments, the user interface 800 may be provided to a user before the secondary voice communications application 310 is functional. For example, in some embodiments, the user interface 800 may be provided to the user when the telecommunications device 300 is powered-up, and in other embodiments, the user interface 800 may be provided to the user the first time the secondary voice communications application 310 is launched. In such embodiments, the secondary voice communications application 310 may be non-functional until the telecommunications device 300 is registered with the SVC controller 130.

In some embodiments, the user interface 800 may be provided to a user, from time to time, after the secondary voice communications application 310 is functional. For example, the user interface 800 may be provided to a user whenever the secondary voice communications application 310, even after registration of the telecommunications device 300. As another example, the user interface 800 may be provided to the user, when the telecommunications device 300 at a location for which an emergency services address has not been verified.

The user interface 800 may include a keypad 802 with which a user may manually enter information. The keypad 802 may be implemented on touch screen or may be implemented with physical keys.

The user interface 800 may include an output window 804 that displays information/instructions to the user and a first input/output window 806. The input/output window 806 may a form that is auto-populated with one or more geo-location address identifiers 808 and corresponding buttons 810. The input/output window 806 may be a touch sensitive window, and the user may select one of the geo-location address identifiers 808 by clicking on the corresponding button 810.

The user interface 800 may further include a second input/output window 812. The second input/output window 812 may provide instructions 814 to the user such as instructing the user to manually input a geo-location address and may provide an input field 816. The user may use the keypad 802 to manually enter data in the input field 816.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method of providing telecommunications services, the method comprising:
   receiving a request for voice communications, over a wireless point-to-point network, by a telecommunications device configured to provide voice communications over a cellular telecommunications network;
   determining whether the telecommunications device has a verified emergency services address associated therewith, wherein the verified emergency services address is an address that emergency services are directed to in the event of an emergency; and
   auto-populating a geo-location address identifier for emergency services in response to determining that the telecommunications device does not have a verified emergency services address associated therewith, the geo-location address identifier to serve as the verified emergency services address, wherein the auto-populating includes selecting the geo-location address identifier from a list including multiple, prioritized instances of geo-location information based on the priorities of those instances,
   wherein the list including the multiple, prioritized instances of geo-location information is specific to a user of the telecommunications device, and
   wherein each of the multiple, prioritized instances of geo-location information is a location of the user of the telecommunications device.

2. The method of claim 1, the method further comprising:
   granting the request for voice communications, over the wireless point-to-point network, by the telecommunications device, in response to determining that the telecommunications device has a verified emergency services address associated therewith; and
   denying the request for voice communications, over the wireless point-to-point network, by the telecommunications device, in response to determining that the telecommunications device does not have a verified emergency services address associated therewith.

3. The method of claim 2, wherein another device, remote from the telecommunications device, determines whether the telecommunications device has a verified emergency services address associated therewith.

4. The method of claim 1, further comprising:
   providing the user of the telecommunications device with the auto-populated geo-location address identifier;
   receiving verification of a geo-location address corresponding to the auto-populated geo-location address identifier; and
   associating the geo-location address, as the verified emergency services address, with the telecommunications device in response to receiving the verification of the geo-location address.

5. The method of claim 1, further comprising:
   retrieving the geo-location address identifier from a memory device of the telecommunications device; and
   storing an association of the verified emergency services address with the telecommunications device in the memory device.

6. The method of claim 1, further comprising:
   retrieving the geo-location address identifier from a memory device that is remote from the telecommunications device; and
   storing an association of the verified emergency services address with the telecommunications device in the memory device.

7. The method of claim 1, wherein the multiple, prioritized instances of geo-location information are prioritized based on their respective sources.

8. The method of claim 7, wherein an instance of geo-location information corresponding to information manually entered by the user is prioritized highest.

9. The method of claim 1, wherein the multiple, prioritized instances of geo-location information include a primary residence geo-location address, a secondary residence geo-location address, a work geo-location address, a geo-location address of a friend or relative, or a geo-location address of a location frequented by the user.

10. One or more non-transitory computer-readable storage media having computer-executable instructions thereon which, when executed by a computing device, implement a method of providing telecommunications services, the method comprising:
    receiving a request for voice communications, over a wireless point-to-point network, by a telecommunications device configured to provide voice communications over a cellular telecommunications network;
    determining whether the telecommunications device has a verified emergency services address associated therewith, wherein the verified emergency services address is an address that emergency services are directed to in the event of an emergency; and
    auto-populating a geo-location address identifier for emergency services in response to determining that the telecommunications device does not have a verified emergency services address associated therewith, the geo-location address identifier to serve as the verified emergency services address, wherein the auto-populating includes selecting the geo-location address identifier from a list including multiple, prioritized instances of geo-location information based on the priorities of those instances,
    wherein the list including the multiple, prioritized instances of geo-location information is specific to a user of the telecommunications device, and
    wherein each of the multiple, prioritized instances of geo-location information is a location of the user of the telecommunications device.

11. The one or more non-transitory computer-readable storage media of claim 10, the method further comprising:
    granting the request for voice communications, over the wireless point-to-point network, by the telecommunications device, in response to determining that the telecommunications device has a verified emergency services address associated therewith; and
    denying the request for voice communications, over the wireless point-to-point network, by the telecommunications device, in response to determining that the telecommunications device does not have a verified emergency services address associated therewith.

12. The one or more non-transitory computer-readable storage media of claim 10, the method further comprising:
    providing the user of the telecommunications device with the auto-populated geo-location address identifier;
    receiving verification of a geo-location address corresponding to the auto-populated geo-location address identifier; and associating the geo-location address, as the verified emergency services address, with the telecommunications device in response to receiving the verification of the geo-location address.

13. The one or more non-transitory computer-readable storage media of claim 10, the method further comprising:
providing a geo-location address for receiving emergency services to a device remote from the telecommunications device.

14. The one or more non-transitory computer-readable storage media of claim 10, wherein the multiple, prioritized instances of geo-location information are prioritized based on their respective sources.

15. A telecommunication device configured to provide voice communications over a cellular telecommunications network, comprising:
a processor; and
a plurality of instructions that, when executed by the processor, configure the telecommunication device to perform operations comprising:
receiving a request for voice communications, over a wireless point-to-point network;
determining whether the telecommunications device has a verified emergency services address associated therewith, wherein the verified emergency services address is an address that emergency services are directed to in the event of an emergency; and
auto-populating a geo-location address identifier for emergency services in response to determining that the telecommunications device does not have a verified emergency services address associated therewith, the geo-location address identifier to serve as the verified emergency services address, wherein the auto-populating includes selecting the geo-location address identifier from a list including multiple, prioritized instances of geo-location information based on the priorities of those instances,
wherein the list including the multiple, prioritized instances of geo-location information is specific to a user of the telecommunication device, and
wherein each of the multiple, prioritized instances of geo-location information is a location of the user of the telecommunications device.

16. The telecommunication device of claim 15, wherein the multiple, prioritized instances of geo-location information are prioritized based on their respective sources.

17. The telecommunication device of claim 16, wherein an instance of geo-location information corresponding to information manually entered by the user is prioritized highest.

18. The telecommunication device of claim 15, wherein the operations further comprise:
granting the request for voice communications, over the wireless point-to-point network, in response to determining that the telecommunications device has a verified emergency services address associated therewith; and
denying the request for voice communications, over the wireless point-to-point network, in response to determining that the telecommunications device does not have a verified emergency services address associated therewith.

19. The telecommunication device of claim 15, wherein the operations further comprise:
providing the user of the telecommunications device with the auto-populated geo-location address identifier;
receiving verification of a geo-location address corresponding to the auto-populated geo-location address identifier; and
associating the geo-location address, as the verified emergency services address, with the telecommunications device in response to receiving the verification of the geo-location address.

\* \* \* \* \*